United States Patent
Abts (10) Patent No.: US 7,584,053 B2
(45) Date of Patent: Sep. 1, 2009

(54) UNIVERSAL REMOTE TERMINAL UNIT AND METHOD FOR TRACKING THE POSITION OF SELF-PROPELLED IRRIGATION SYSTEMS

(75) Inventor: Gerald L. Abts, Denver, CO (US)

(73) Assignee: Reintech, LLC, Deshler, NE (US)

( * ) Notice: Subject to any disclaimer, the term of this patent is extended or adjusted under 35 U.S.C. 154(b) by 522 days.

(21) Appl. No.: 11/195,282

(22) Filed: Aug. 2, 2005

(65) Prior Publication Data

US 2006/0027677 A1 Feb. 9, 2006

Related U.S. Application Data (60) Provisional application No. 60/598,950, filed on Aug. 5, 2004, provisional application No. 60/613,773, filed on Sep. 28, 2004, provisional application No. 60/695,076, filed on Jun. 29, 2005.

(51) Int. Cl.
*B05B 12/00* (2006.01)
(52) U.S. Cl. ........................ 701/213; 239/727
(58) Field of Classification Search ................ 701/207, 701/213–216; 239/727–733, 739–743, 722, 239/723, 726; 700/284; 702/2
See application file for complete search history.

(56) References Cited

U.S. PATENT DOCUMENTS

| | | | |
|---|---|---|---|
| 6,290,151 B1 | 9/2001 | Barker et al. | |
| 6,337,971 B1 | 1/2002 | Abts | |
| 6,469,628 B1 * | 10/2002 | Richards et al. | 340/573.3 |
| 6,512,992 B1 | 1/2003 | Fowler et al. | |
| 6,522,948 B1 * | 2/2003 | Benneweis | 700/243 |
| 6,594,706 B1 | 7/2003 | DeCoursey et al. | |
| 6,633,786 B1 * | 10/2003 | Majors et al. | 700/79 |
| 6,666,384 B2 | 12/2003 | Prandi | |
| 6,853,883 B2 * | 2/2005 | Kreikemeier et al. | 700/284 |
| 2004/0117070 A1 | 6/2004 | Barker | |

* cited by examiner

*Primary Examiner*—Dalena Tran
(74) *Attorney, Agent, or Firm*—G. Brian Pingel; Camille L. Urban (57) ABSTRACT

A universal remote monitoring system and method for irrigation systems having a self-contained remote terminal unit mounted at an outer portion of the irrigation system which is independent of the irrigation system control. The unit includes a global positioning system for producing coordinate data, a computer for processing the coordinate data into operational data, and a transmitter for delivering the operational data to a communications satellite. The satellite relays the operational data through a communications network into a remote service computer which generates information messages to mobile operator devices informing the operator of movement status and other operational information.

12 Claims, 9 Drawing Sheets

| TIME | GPS POSITION COORDINATES | MOVEMENT (FEET) |
|---|---|---|
| $T_1$ | $GPS_1$ | 17 |
| $T_2$ | $GPS_2$ | 17 |
| $T_3$ | $GPS_3$ | 17 |
| $T_4$ | $GPS_4$ | 17 |
| $T_5$ | $GPS_5$ | 17 |
| $T_6$ | $GPS_6$ | 0 |

UNIVERSAL REMOTE TERMINAL UNIT AND METHOD FOR TRACKING THE POSITION OF SELF-PROPELLED IRRIGATION SYSTEMS

RELATED APPLICATIONS

This application claims the benefit of U.S. Provisional Patent Application Ser. No. 60/598,950 filed Aug. 5, 2004; U.S. Provisional Patent Application Ser. No. 60/613,773 filed Sep. 28, 2004 and U.S. Provisional Patent Application Ser. No. 60/695,076 filed Jun. 29, 2005.

BACKGROUND OF THE INVENTION

1. Field of the Invention

The present invention relates generally to center pivot and lateral move irrigation systems. More specifically, the present invention relates to a remote monitoring unit which senses movement or non-movement of the irrigation system over a span of time to determine operating status (running or stopped), to determine pivot arm position (e.g., location of last wheel set) and to remotely sense water delivery through the span pipes to determine wet/dry status. The remote monitoring unit is self-contained without having to hard-wire directly to any existing control or other electrical circuits of the irrigation system.

2. Discussion of the Background

Mechanized sprinkler irrigation systems, such as center pivot and lateral move irrigation systems, are commonly used and almost 200,000 exist in the United States alone. Typical systems irrigate over 100 acres to as high as 600 acres. Factors such as soil type, soil water intake rate, slope, water availability, energy costs, flotation for wheels and land obstacles affect the use of such systems. Large farms with scattered field sites and multiple crops are typical users of center pivot and lateral or linear move mechanized irrigation systems. Manually monitoring such systems by "on site inspections" has been the norm. Two to three daily on site visits by 4WD pickup truck, SUV or ATV are considered minimal to observe and respond to shutdowns and breakdowns and to maintain irrigation schedules that meet crop water requirements. An unnoticed shutdown may result in substantial loss of the crop.

Center pivot irrigation systems typically are set up to apply a specific amount of water to the whole field (one 360 degree rotation). Such applications typically take three to four days to complete and longer for larger fields. Therefore, the amount of changes to the pivot setup is infrequent (one or two per week, driven by weather and crop growth stage). In terms of remote control and monitoring, the primary need is to know "status"; i.e., is the irrigation system running (moving), with or without water and has it shutdown? Unplanned stoppages are common due to field conditions (stuck wheels) and mechanical and electrical malfunction (broken drive lines, failed electro-mechanical devices, etc.). Water delivery systems also breakdown and cause irrigation systems to stop. Electrical power outages and deliberate load shed schemes by power providers can cause hundreds of irrigation systems to shutdown at any hour of the day. Water delivery systems powered by natural gas engines are subject to gas line pressure fluctuations that can cause internal combustion engines to shutdown, resulting in loss of water delivery and a center pivot shutdown. Mechanized irrigation systems need to be monitored 24/7 to maintain critical watering schedules for optimum yield and crop quality.

Over the last twenty-five years several remote monitoring systems have been put to commercial use. All use telemetry and all require a wired interface between the control circuitry of the center pivot main panel and the digital and analog inputs to the monitoring device, typically called a remote terminal unit (RTU). Typical RTUs include either a hard wire connection to telephone circuits or a wireless radio for remote communication. Telemetry systems sold by irrigation system manufacturers often include electronic and programmable center pivot main panels (or other hardware retrofits) at the center pivot point with radio telemetry paths to on-farm "base station" computers, running proprietary software. Most include remote control functions and some monitor pivot position using an electronic encoder or resolver, rotated at the pivot center point by the movement of the first drive tower, to sense pivot arm position in degrees from north at the front of the center pivot. The pivot arm position, in turn, is used by a programmed set of instructions stored in the pivot main panel or at a base station computer to initiate control changes based on pivot arm position such as pivot speed changes, pivot direction changes, turning the pivot off, end guns on, etc.

Recent developments by center pivot manufacturers and others have been to use one or two GPS receivers in-lieu-of the mechanical encoder or resolver heretofore used with the "programmable" main panels to determine pivot arm position (azimuth from the center pivot point or a starting point for a lateral move sprinkler) and, thereby, control the functions of a center or lateral move sprinkler based on pivot arm position.

U.S. Pat. No. 6,512,992 (Fowler, et al, Inventor; Raven Industries, Inc., assignee) refers to a GPS-based control system for irrigation using two GPS receivers. This system claims an improved "positioning" and alignment system by using GPS and differential GPS (DGPS) methods to monitor the absolute and/or relative position of a selected location near the end of the pivot arm referenced from a fixed, known position of a central tower (center pivot point). Fowler describes a device to determine pivot arm position (azimuth and the distance between the fixed center point and the end of the moving pivot arm) using two GPS receivers, one at the fixed center pivot point and a second at the end of the moving pivot arm. The two GPS receivers (one or both with "differential" GPS) communicate with each other to remove GPS errors. Fowler also claims a device to detect the degree of "misalignment" of drive towers along the pivot arm using the two GPS receivers. Fowler further claims a method of controlling the plurality of reversible drive motors (one at each drive tower) to maintain alignment of the jointed pipe spans making up the length of the pivot arm. Fowler also claims a method of monitoring the degree of misalignment in order to identify failed drive towers.

U.S. Patent Application Publication U.S. 2004/0117070 (Luke J Barker, inventor; Reinke Manufacturing Co., Inc., assignee) refers to a GPS-based control system for irrigation that uses a single GPS receiver at the end of the pivot arm. This GPS receiver has stored in memory coordinates for the fixed GPS position of the center pivot point. Using the stored reference GPS coordinates of the center point along with the roving GPS receiver's coordinates facilitates calculation of the pivot arm azimuth with a single GPS receiver. Barker asserts that there is a need for an improved control system for center pivot and lateral move sprinklers that use GPS to accurately detect the angular position of a center pivot arm and to accurately detect the distance traveled by a lateral move sprinkler, and that uses such information to control various functions of the irrigation system. The control system receives the two GPS position coordinates (one fixed and stored, the other from the roving GPS receiver at the end of the pivot arm) and communicates with the center pivot main panel to control a function of the irrigation system, such as stopping, reversing, end gun operation, application rate, etc., at a selected distance (lateral move sprinkler) or azimuth value (center pivot).

Without regard to the type of main panel or the degree of programmability based on pivot arm position, the prior art method of remotely monitoring on/off status is to monitor by radio the electric control circuitry with digital inputs interfaced and hard wired from a remote terminal unit (RTU) to the electrical circuitry of the center pivot control panel located at the fixed center pivot point. This requires electrical connections inside the center pivot main panel. Because there are many brands and models of center pivots in use, many with unique control circuitry, a degree of expertise and electrical wiring competency is required for safe and correct installation that provides the needed functionality and meets the requirements of the National Electrical Code for Center Pivot and Lateral Move Sprinklers. Furthermore, the sensitive electronics and radios needed to remotely monitor pivot status by this hard-wired method are easily interfered with and can be damaged from improper installation, electrical power surges and lightning events. As a result, the systems tend to be costly to manufacturer, install and maintain.

These types of remote monitoring and control systems are expensive and are often impractical on older pivots without extensive upgrades to the pivot point and the pivot controls. Often older pivot control circuitry has been field modified over years of maintenance. Many lack proper documentation to facilitate the proper interface of circuitry wires required with traditional remote monitoring devices.

A need therefore exists for a universal remote terminal unit (RTU) that does not interface with the AC control or AC power wiring of the mechanized irrigation system. A need further exists to self-contain the RTU with independent power, and with the ability to independently detect movement and non-movement and/or water delivery status and to transmit such status changes to a remote location in a format that is easily understood by the operator of the mechanized irrigation systems. A need further exists for a universal RTU that is simple to install, without electrical wiring know-how and is simple to relocate to alternative center pivots for maximum utility and cost effectiveness. A need further exists for a wireless device for determining pivot position (azimuth of the pivot arm around the center point or the location of a lateral move sprinkler) using a single GPS receiver at or near the end of the pivot arm.

SUMMARY OF THE INVENTION

The present invention is directed to a self contained, universal RTU which mounts at an outer tower of a center pivot or lateral move sprinkler and communicates data packets of pivot status to a central server by terrestrial or satellite telemetry. Changes in monitored status of the sprinkler system along with Global Position Satellite (GPS) coordinate data are conventionally transmitted to a central server and recorded in a central server data base which is used to update website pages that display pivot status and history. Irrigators are in turn alerted to changed pivot status using voice telephone messages, e-mail messages, text messaging to cell phones, PDAs, pagers and other portable Internet connected devices. See Pivotrac.com, LLC U.S. Pat. No. 6,337,971 which is incorporated herein by reference. The term "universal RTU" is used in this application to designate an RTU which can be used with all past and future mechanized center pivot and lateral move irrigation systems.

A simple "current sensor" is used by the present invention to detect movement of an outer drive tower and thereby pivot running status (on or off). The current sensor device is standard and readily available. The current sensor need only be positioned around a single, insulated conductor of an electrical circuit that is continuously or intermittently conducting AC current (i.e., cycling on and off over several minutes of time) whenever the pivot is moving. The present invention completely eliminates the need for any hard-wire connections between the circuitry of a remote terminal unit (RTU) and the AC control or power circuits of the center pivot irrigation system in order to establish pivot on/off status. Use of a current sensor and specific microprocessor logic enables the universal RTU of the present invention to determine if a center pivot sprinkler is running (moving) or is stopped. The use of a current sensor by the system and method of the present invention along with a stand alone GPS receiver eliminates a hard-wired interface with the existing control or power circuits—i.e., the present invention comprises a truly "wireless" interface remote monitoring system. The current sensor device need only be positioned around a conducting wire (e.g., over the plastic insulation of the wire).

The GPS receiver is built into the RTU and has no wired connections to the center pivot control or power circuitry. Installation of a remote monitoring device (RTU) is thereby greatly simplified, requiring no hard-wire electrical connections or electrical wiring skills. This saves on installation and hardware costs, simplifies portability of RTUs among alternative center pivots, and greatly improves reliability by isolating the RTU electronics from the high-voltage circuits traditionally used to monitor pivot-running status.

The GPS receiver is simple in application, requiring no wires. GPS coordinate data for the location of the RTU (which is mounted to a roving (moving) outermost tower of the pivot) is simply transmitted to the central server by conventional telemetry. From a data base of GPS coordinates transmitted to the central server and archived over time, the central server software will calculate the series of GPS coordinates making up the circumference of the center pivot circular area (or a portion of the arc of the theoretical circumference). From these coordinates the theoretical center point of the center pivot can be determined. In turn, using the theoretical fixed center point coordinates in combination with the current GPS receiver coordinates reported by the RTU to the central server, the central server software can calculate the azimuth making up the position of the RTU relative to the fixed GPS coordinates calculated above, i.e., the pivot arm position. This data is readily graphed to Internet websites or other graphic displays using a circle (or part circle) with a single spoke indicating the location of the center pivot arm. The GPS data can also be used to determine the direction of travel of the pivot arm (forward or reverse) and the speed of travel and thereby, the rate of water application.

The wireless interface universal RTU of the present invention in one embodiment is mounted on top of the span pipe on the next-to-last drive tower of the center pivot (the best location to sense pivot movement and a suitable location to sense water pressure or flow and pivot arm position using GPS coordinate data, and to provide optimum data transfer telemetry). Monitoring pivot movement or non-movement with a simple current sensor does not require a hard-wire interface to the pivot control or power circuitry. Likewise, the incorporation of a GPS receiver in the RTU does not require a hard-wire interface to the pivot control or power circuitry, and the GPS receiver enables a "redundant" means to the current sensor means of sensing movement or non-movement of an outer span of the center pivot arm over time.

The present invention will work equally well on any electrically powered center pivot or lateral move sprinkler with electrical circuits controlling and powering the movement of the outer spans.

The RTU of the present invention is self-contained. The low power RTU with telemetry radio and GPS receiver is powered by a battery with a solar panel for recharge either incorporated into the RTU or with separately mounted solar array. With the RTU mounted on top of the center pivot span pipe, generally twelve feet above ground level and above the water spray and the crop canopy, the problem of mineral deposits forming on the surface of the solar panels is greatly mitigated and any "shadow effect" from the pivot structure or the crop on the solar panel is also eliminated.

With scarce and expensive labor and high vehicle operating costs, the self-contained RTU of the present invention offers the operators of mechanized irrigation systems a low cost method of
1) Remotely monitoring the movement or non-movement of center pivots to determine if they are running, with or without water delivery;
2) Tracking pivot arm movement over time and to determine current pivot arm position (the azimuth relative to the fixed pivot point), speed of rotation, direction of travel of the pivot arm, and rate of water application—all from the GPS coordinate data transmitted from the RTU mounted to the moving pivot arm; and
3) Using a central server with Internet connectivity and wireless telemetry to provide a method of alerting operators to status changes in a timely manner, wherever they are.

In particular the use of the wireless interface remote monitoring device to determine pivot movement or non-movement (both by the "current sensor" device and by the redundant "GPS receiver" device) is a practical way to monitor running or stopped status of any electric center pivot or linear move irrigation system. The GPS device could also be used to monitor hydraulic center pivots where AC power is not available to use the current sensor.

It is an object of the present invention to provide a safe and simplified installation and an improved method to remotely monitor center pivot running status (on or off, wet or dry, and pivot arm position, direction, speed of travel and rate of water application) with improved reliability and lowered cost.

It is a further object of the present invention to provide a safe, wireless and simplified installation of a self contained RTU with a simple electric current sensor, a GPS receiver and a water delivery pressure switch or transducer, to remotely monitor center pivot status with improved reliability and lowered cost.

It is a still further object of the present invention to remotely sense pivot movement or non-movement by means of a non-conducting current sensor incorporated into the wireless interface remote monitoring system that detects the flow of electrical current used to power the wheels or control movement of the center pivot and to send such moving or non-moving status data by means of long distance telemetry to a central control computer operated by a third party service operator for the benefit of pivot operators anywhere.

It is a further object of the present invention to redundantly sense pivot movement or non-movement by means of a GPS receiver incorporated into the RTU. The RTU microprocessor determines movement or non-movement based on changing or static GPS coordinate readings taken over time and within the error tolerance of the GPS method. Based on GPS coordinate readings, the microprocessor determines a change in status from movement to non-movement or non-movement to movement. Once determined, the change in status is treated as an "event" by the RTU. Each event so determined causes the RTU to transmit a data packet including GPS coordinate data by means of long distance telemetry to a central control computer operated by a service operator for the benefit of pivot operators anywhere. Data transmitted will include:
1) GPS coordinate readings over time to enable a central computer to "double check" the RTU calculations that resulted in an event that triggered the data packet transmission from the RTU to the central server;
2) GPS coordinate readings over time to enable a central computer to calculate the fixed center point of the center pivot arc created by the movement of the pivot arm;
3) GPS coordinate readings over time to enable a central computer to calculate the circumference of the circular pattern of the moving pivot arm over time;
4) GPS coordinate readings over time to enable a central computer to calculate the azimuth of the current position of the GPS receiver mounted to the end of the pivot arm with reference to the fixed center point calculated in 2, above), i.e., the current pivot position stated in degrees of a circle with north being 0 degrees;
5) GPS coordinate readings over time to enable a central computer to calculate the center pivot ground speed overtime; and
6) GPS coordinate readings over time to enable a central computer to calculate the rate of water application (using the ground speed calculated in 5, above).

It is a further object of the present invention to provide a wireless interface remote monitoring system that can be used with both center pivot irrigation systems and lateral (linear) move systems, including hydraulically driven pivot and lateral move sprinklers.

It is a further object of the present invention to remotely sense water delivery to an outer pipe span of the center pivot by means of a sensor incorporated into the wireless interface remote monitoring system (RTU) that detects the presence of water delivery using water pressure or water flow and to send such water status data (wet/dry) by long distance telemetry to a central control computer operated by a third party service operator for the benefit of pivot operators anywhere.

It is a further object of the present invention to upload the information processed by the central control computer to discrete website pages for end users, the content of which will include graphic and tabular data displays of pivot running status (color coded circular graphics indicating pivot and water delivery status with a line or marker indicating current pivot arm position in degrees from north, direction of travel, speed of travel, and water application rate, field by field, both historical and in real time).

It is a further object of the present invention to provide a universal, self-contained, wireless interface remote monitoring system that is economical to manufacture; simple to install and relocate; efficient in use; capable of being retrofit to any of a number of different center pivot irrigation systems without modification; reliable; and well suited to operate on both center pivots and linear move systems in all environments, anywhere in the world.

To accomplish these and other objects, a wireless interface RTU designed to retrofit on any mechanized irrigation system is provided with a self contained power source, a current sensor device requiring no hard-wired connections to detect running or stopped center pivot sprinkler status, a GPS receiver requiring no hard-wired connections to redundantly detect running or stopped center pivot sprinkler status, a method of sensing water delivery, a microprocessor and a telemetry radio transceiver (terrestrial or satellite).

An alternative and redundant method of the present invention for detecting the movement or non-movement of a center pivot is through a series of timed GPS coordinate readings taken by the GPS receiver built into the RTU. If the pivot has stopped moving, these GPS readings would all be within the defined error tolerance for a stationary object. If the pivot arm were continuing to move, these time phased coordinate readings would indicate movement. In this way the GPS receiver data would be interpreted to determine movement and for several readings over a span of time the pivot speed and direction of travel can also be derived. This GPS method of monitoring movement or non-movement of the pivot arm enables remotely monitoring on/off status of "hydraulic" powered pivot and lateral move irrigation systems.

A water delivery sensor connected to the sprinkler pipe is used to simultaneously monitor and record the delivery of water (minimum pressure or flow to the pipe approximate to the drive tower being monitored with the current sensor and with the GPS receiver). Based on a change in status or on a timed basis, data packets of center pivot sprinkler running or stopped status (determined by either the current sensor means or by the GPS coordinate measurement means), GPS coordinate data and water delivery status can be transmitted over wireless telemetry systems to a central control computer to remotely determine pivot movement or non-movement and wet or dry status over a span of time.

The RTU mounted at an outer pipe span of the center pivot communicates by radio (terrestrial or satellite) to a central control computer that is Internet connected. The data packets are, in one embodiment, "event" driven whenever the RTU determines that a pivot has changed from stopped to moving or from moving to stopped or whenever the RTU determines that a pivot has changed from a "wet" to a "dry" or a "dry" to a "wet" water delivery status. In addition, the data packet will include time stamps for all recorded status conditions, including the current GPS coordinates indicating position. All status changes and other data packet reports will be processed at the central server using appropriate software and data will be detailed and summarized for the benefit of each irrigator. The data will be prepared for presentation via the Internet. The Internet content will be uploaded to discrete pages of a website(s) for use by pivot managers and operators and others and will include summary and detail displays of wet or dry status, running or stopped pivot status, speed of travel, direction of travel, rate of water application and pivot arm position for individual pivots and for groups of pivots.

Additionally, the status data collected by the central control computer can be delivered to center pivot managers and operators and others over "mobile" telemetry platforms, including alphanumeric paging, text messaging and other portable wireless devices available to mobile center pivot operators and capable of receiving e-mail, SNTP, SMTP, FTP or other wireless messaging.

Additionally, the status data collected by the central control computer can be delivered verbally to center pivot managers and operators and others using interactive voice response (IVR) or other conventional voice messaging devices.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
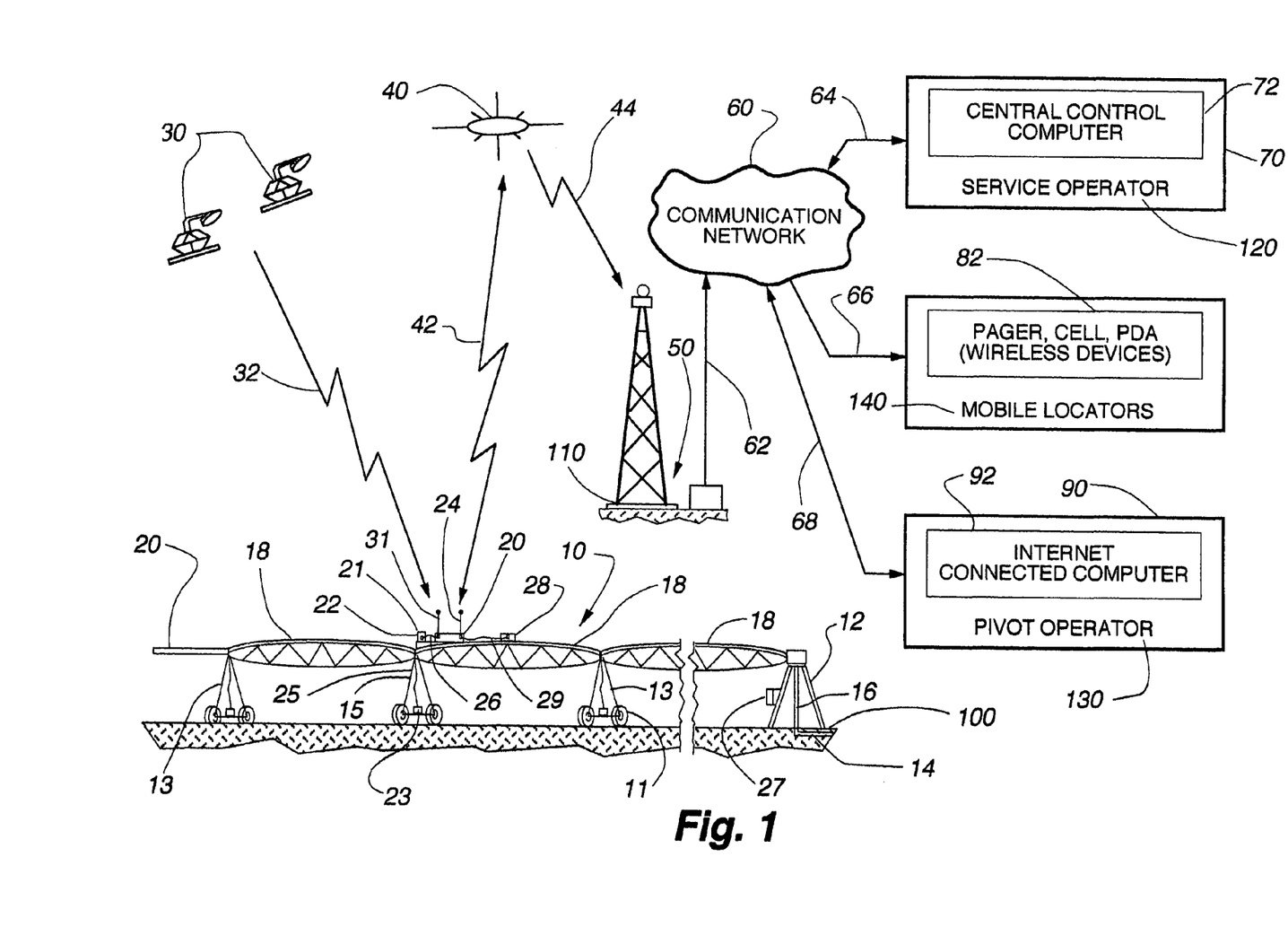
FIG. 1 is a pictorial diagram showing a center pivot irrigation system having a remote terminal unit (RTU) according to the present invention positioned near an outer drive tower of a pivot span with a current sensor and a GPS receiver and showing the telemetry path for the GPS data and for the status data sent to a ground station and forwarded to a central control computer for processing and redelivery to a pivot operator.

The system of the present invention is illustrated in FIG. 1 as being connected to a center pivot or lateral mechanized irrigation system 10 (herein sometimes simply referred to as "pivot" or "center pivot"). The invention includes a universal, self-contained remote terminal unit (RTU) with global position satellite (GPS) receiver 20 which receives signals 32 from GPS positioning satellites 30. The remote terminal unit is further connected 42 to a low orbit data communication satellite 40, a ground station 50, a communication network 60, a service operator location 120, multiple mobile locations 140, and a remote pivot operator monitoring location 130.

Mechanized irrigation systems 10 are conventional and commercially available from a number of different manufacturers. Mechanized irrigation systems 10 are commonly used in a center pivot configuration such as shown in FIG. 1 wherein the center pivot point 12 extracts pressurized water 14 for delivery through a fluid delivery system 16 through spans of pipe 18 supported by wheeled drive towers 13 for delivery onto the ground. Such center pivot irrigation systems 10 have wheels 11 at pivot drive towers 13 and the center pivot pipe spans 18 can add up to any desired length from center pivot point 12 to pivot end position 20. Another type of mechanized irrigation system not shown is one that moves in a lateral or linear orientation across a field. The present invention is not limited to the type of mechanized irrigation system (center pivot 10 or lateral move, not shown). The center pivot system 10 shown in FIG. 1 will be used for purposes of illustrating and explaining the present invention. The center pivot irrigation system 10 is located at a first physical location 100.

The self-contained RTU 20 with GPS receiver 31 and a current sensor 21 of the present invention is typically located on any outer drive tower 15 of the center pivot irrigation system 10. The term "self-contained" means that the RTU 20 does not hard-wire interface to the electronics or the electrical wiring of the control or power circuitry for the mechanized irrigation system 10. It provides a self-contained operation independent of and isolated from the electrical circuitry of the mechanized irrigation system 10.

In another embodiment, the RTU 20 could be located at the main control panel 27 at the center pivot point 12. Electrical current could be sensed by current sensor 21 in the main panel 27 to indicate the center pivot 12 is moving or stopped. However, without sensing the on off cycle of an intermediate drive tower 13, the current sensor 21 could provide a false read of pivot status. Also, located at the fixed center point of the center pivot 12, the GPS data would not track pivot arm movement over time. Therefore, the preferred embodiment is for the RTU 20 and the current sensor 21 to be located on the pipe span 18 above an outer drive tower 15, e.g., the next-to-last drive tower. The details of the RTU 20 and the current sensor 21 of the present invention will be presented subsequently in FIGS. 8 and 9. However, the RTU 20 has a satellite or terrestrial communication antenna 24 and a GPS receiver and antenna 31.

The RTU 20 of the present invention has a "wireless interface" (no hard-wire connections used) with the center pivot irrigation system 10 using a current sensor device 21 connected to a cable 26 and located in or near the tower control box 22. The current sensor 21 is used for detecting current flow to drive motor 23 and therefore movement of the drive tower 15 over time. In other words, the RTU 20 is mounted to a point along the roving or moving pipe span 18 of the center pivot 10, but does not hard-wire interface with any of the tower control box 22 wiring used to control or power the drive motors 23 of center pivot irrigation system 10.

A second and redundant method of determining pivot movement or non-movement is by way of a GPS receiver and antenna 31, receiving GPS satellite 30 signals by wireless path 32. The RTU 20 records time phased GPS position coordinates in non-volatile memory in RTU 20. GPS position "readings over time" are used by the microprocessor 550 (FIG. 9) in RTU 20 to determine movement or non-movement of drive tower 15. These GPS coordinate readings also provide data to determine drive tower 15 speed and, thereby, movement of pivot arm 18.

The low orbit communication satellite 40 is also a conventionally available service such as Orbcomm, which is in communication with antenna 24 for delivery of data packets as shown by wireless path 42. Orbcomm is located at 21700 Atlantic Boulevard, Dulles, Va. Orbcomm U.S. Pat. No. 6,594,706 is incorporated herein by reference. The low orbit satellite 40 is also in communication by wireless path 44 with a ground station 50 at a remote second location 110. It is well known that such ground stations 50 can receive the data packets transmitted from a remote device such as RTU 20 over antenna 24 to satellite 40 for delivery into a communication network 60 such as by means of communication line 62. While the use of a low orbit satellite telemetry system is one approach, the present invention is not limited to this and it is to be understood that any suitable satellite or terrestrial telemetry transmitter (receiver) system can be utilized for collecting data from the RTU 20 of the present invention for delivery into a communication network 60.

The communication networks 60 are existing and well known and include private communication networks for communication over the Internet. Any suitable communication network 60 can be used for purposes of the present invention.

A service operator 70 at another remote location 120 retrieves the data by way of communication path 64 from the communication network 60 and processes it for a responsible person or pivot operator 90 (end-user). The service operator 70 at location 120 has a central control computer 72 which processes the received data from the RTU 20, on behalf of a center pivot operator 90, for the delivery of the data by path 66 to multiple "mobile locations" 140 in a format that can be received and displayed by "wireless devices" 82 such as pagers, cellular phones using text messaging, PDAs, hand held PCs, etc. Examples of the format of such wireless messages can include email, SNTP, SMTP, FTP, text messages, graphical displays, etc., that can be received by remote mobile devices 82 carried by mobile pivot operators 90 and others. The service operator 70 can deliver more detailed monitoring information received from communication network 60, through path 64 and processed by central control computer 72. This processed information can be delivered by communication path 68 to the center pivot operator's 90 computer 92 at the location 130. As an example, the service operator 70 could determine roving pivot arm 18 position (azimuth), speed and direction of travel, calculate area of the circle covered by the center pivot, cumulative water application in acre-inches based on hours of pumping (wet time), water application rate at current speed and acres irrigated and provide this information in summary and detail form to the pivot operator 90 at location 130 on an Internet connected computer 92.

In FIG. 1, the system and method of the present invention provides the pivot operator 90 responsible for monitoring the operation of the pivot irrigation system 10 at location 100 with the ability at location 130 or at the mobile locations 140 to monitor the status of drive tower 15 by means of RTU 20 and a current sensor 21 and a GPS receiver and antenna 31 so as to know when the center pivot irrigation system 10 is moving or when it is not moving (movement provided by wheeled drive towers 13). Other parameters such as pivot position (azimuth); speed and direction of travel are calculated by microprocessor 550 in RTU 20 from GPS data received from GPS satellites 30 over wireless path 32. Also, the pivot operator 90 at locations 130 and 140 can monitor water pressure and/or flow rate and cumulative flow as indicated by pressure/flow sensor 28 over hydraulic water line 29 to RTU 20.

Figure 4:
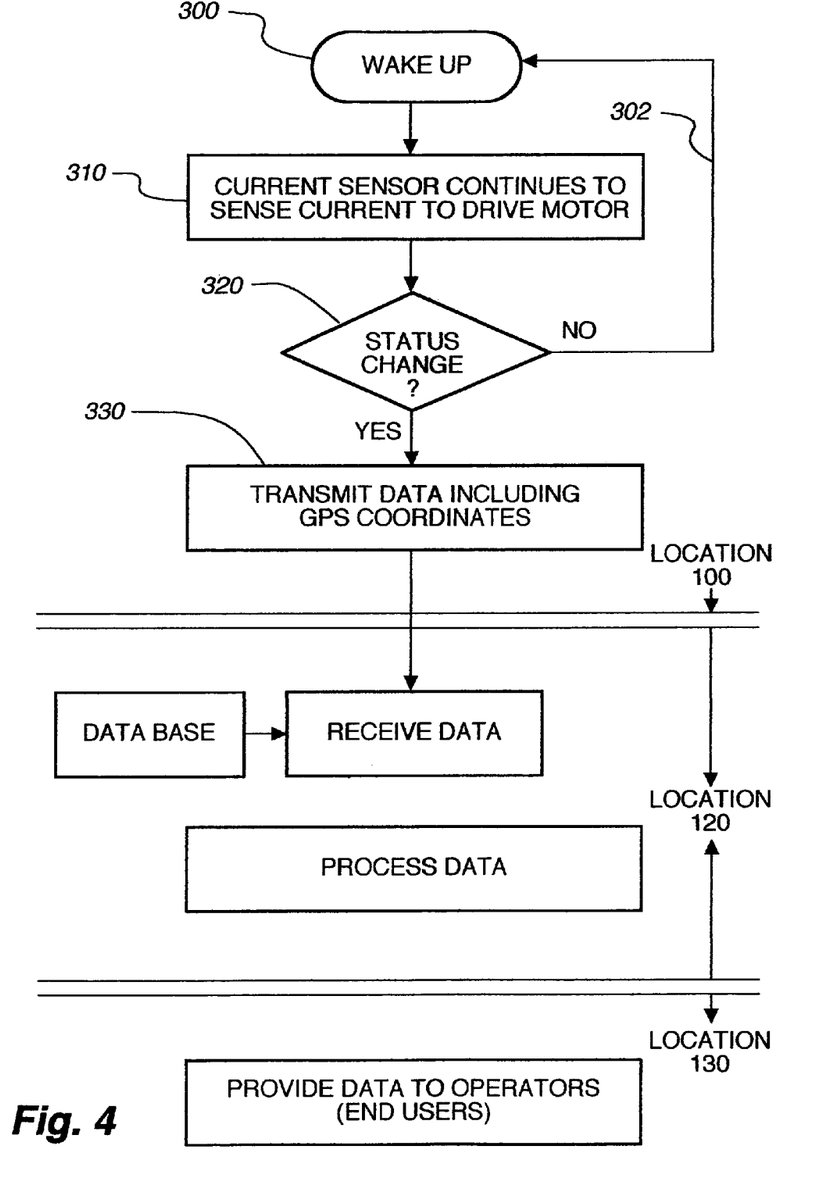
FIG. 4 is a flow chart of the main processing steps used by the current sensor equipped RTU to remotely monitor and log status changes to a central control computer.

In FIG. 4, the current sensor method of the present invention is set forth. The RTU 20 wakes up 300. In this step, an internal clock or timer causes the RTU 20 to power-up at predetermined intervals such as every minute. This "wake up" feature is conventional and conserves the power supply 520 (FIG. 9) within the RTU 20. The RTU 20 at location 100 then receives 310 the status of the current sensor 21 (running or stopped). In step 320, the method of the present invention determines whether a status change has occurred. For example, the prior status could have been "no movement" (no current flow over a set period of time). If the current sensor data 310 currently being delivered indicates "movement", a status change 320 has occurred. Or, the prior status could have been "movement". In which case, if the current sensor data 310 currently being delivered indicates no movement, then a status change 320 of "no movement" has occurred. In FIG. 4, the transmit data step 330 is event driven, so that whenever the RTU 20 determines that a pivot 10 has changed from a stopped to moving status or from a moving to stopped status, or whenever the RTU 20 determines that a center pivot 10 has changed from a wet to a dry water delivery status as indicated by sensor 28 and hydraulic water line 29, the status data is sent by way of a data packet using wireless path 42 to communication satellite(s) 40. The data packet includes stored data of center pivot sprinkler 10 running status, current GPS position coordinates and water delivery status data so as to establish a wet or dry, running or stopped status to be delivered to the service operator 70 at location 120.

For the current sensor device for monitoring movement as illustrated in FIG. 4, a number of different mathematical algorithms can be used to determine when a status event occurs in stage 310 that requires a status change in 320. The mathematical algorithm used depends upon the tolerance for the interval of the electrical current being sent to drive motor 23 that is being monitored. If an intermediate drive tower 13 nearer to the center pivot point 12 is being monitored and the speed control of the last drive tower 25 is set to a low percent speed setting at main panel 27 (e.g., six seconds on and 54 seconds off to the final drive motor), then the tolerance for determining a non-movement status would be relatively long as compared to monitoring the last or next-to-last drive tower motor 23 of tower 15 of a center pivot sprinkler 10. Whatever mathematical algorithm is used to determine movement or non-movement of drive tower 15, the micro processor 550 using stored current sensor 21 readings in memory 570 determines a status change event from either "movement" to "non-movement" or from "non-movement" to "movement."

Figure 5:
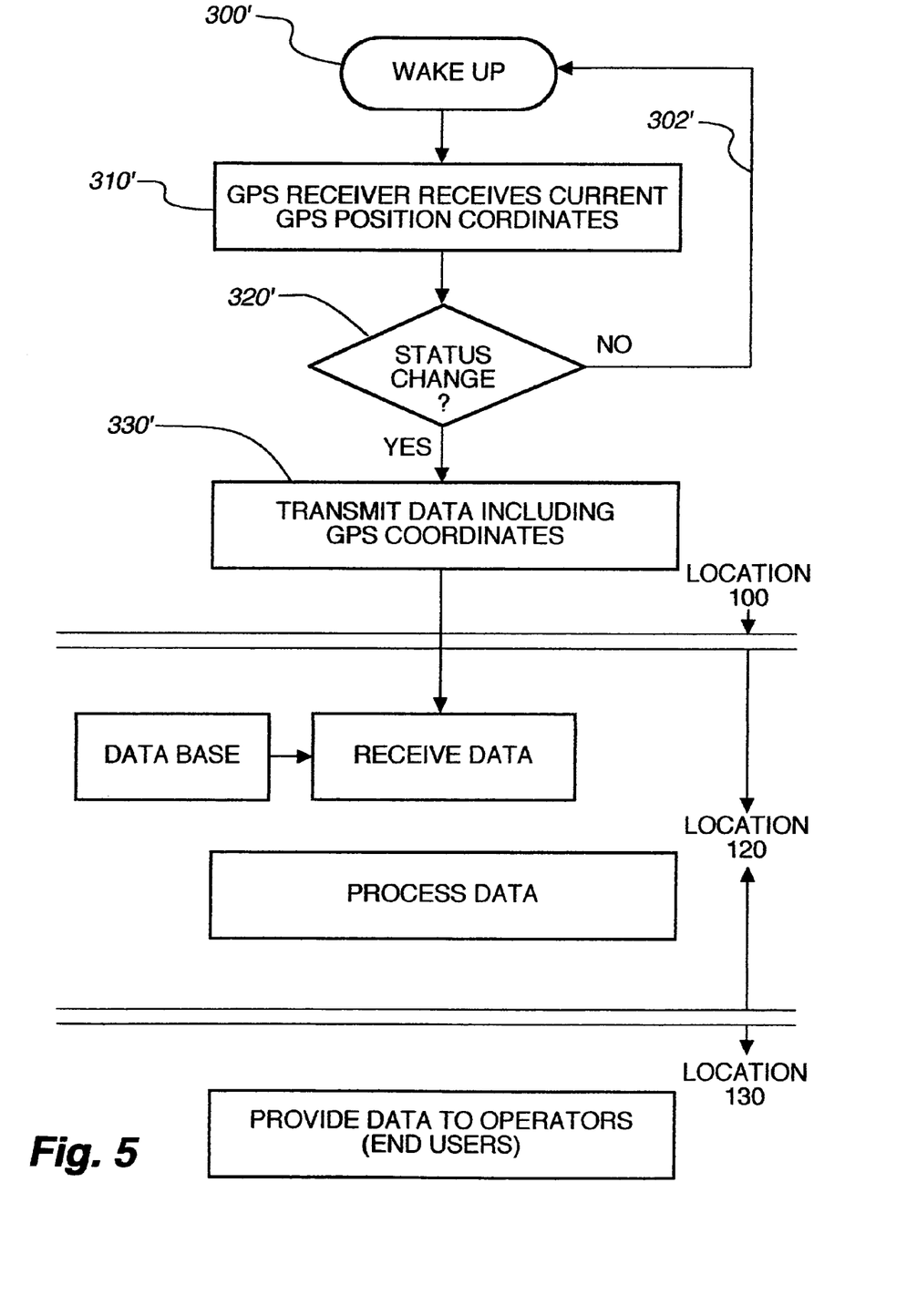
FIG. 5 is a flow chart of the main processing steps used by the GPS receiver equipped RTU to remotely monitor and log status changes to a central control computer.

In FIG. 5 the GPS method of the present invention is set forth. This is a redundant method to the current sensor method of determining movement or non-movement set forth above. The GPS system of the present invention provides a series of GPS coordinate data readings received at the RTU 20 from GPS satellite(s) 30 over wireless path 32 and transmitted by wireless path 42 to communication satellite 40 to ground station 50 and on to the central control computer server 72 by means of communication network 60 to enable the central control computer server 72 to calculate pivot arm 18 position (azimuth), speed of travel, direction of travel and rate of water application.

Referring to FIG. 5, the RTU 20 wakes up 300'. In this step, an internal clock or timer causes the RTU 20 to power-up at predetermined intervals such as every minute. This "wake up" feature is conventional and conserves the battery power supply 520 within the RTU 20. The RTU 20 at location 100 then receives 310' the current GPS position coordinates. Microprocessor 550 compares these current GPS position coordinate readings to a prior GPS position coordinate reading 310' to determine a status change (from movement to non-movement or non-movement to movement of drive tower 15). The GPS coordinate readings that are compared over time are interpreted within known GPS error tolerances by microprocessor 550 in RTU 20 to determine a position change that is interpreted to be movement or non-movement. In step 320', the method of the present invention determines whether a status change has occurred. If the RTU 20 determines a change in status from moving to stopped or from stopped to moving has occurred 320', then the changed status causes RTU 20 to transmit 330' a data packet with current GPS position coordinates to the central control computer 72. For example, if the prior status determination was "no movement" and the current GPS position coordinate readings indicate a "new position" (prior and current GPS position coordinates when compared result in a new position outside the error tolerance of the GPS system), then a change in status 320' has occurred and a data packet is transmitted 330'. If, on the other hand, the prior status determination was "no movement" and the current GPS position coordinate readings indicate the same position (prior and current GPS position coordinates when compared result in the same position within the error tolerance of the GPS system), then a no change in status 320' has occurred and no data packet is transmitted by 330'.

In FIG. 5 the transmit data step 330' is event driven, so that whenever the RTU 20 determines that a pivot 10 has changed from a stopped to moving status or from a moving to stopped status, or whenever the RTU 20 determines that a pivot 10 has changed from a wet to a dry water delivery status as indicated by sensor 28 and hydraulic water line 29, the status data is sent by way of a data packet using wireless path 42 to the communication satellite(s) 40. The data packet includes stored data of center pivot sprinkler 10 running status, current GPS position coordinates and water delivery status data so as to establish a wet or dry, running or stopped status to be delivered to the service operator 70 at location 120.

For the GPS method of monitoring movement as illustrated in FIG. 5, a number of different mathematical algorithms can be used to determine when a status event occurs in step 310' that requires a status change in 320'. The mathematical algorithm used depends upon the error tolerance assumed for the GPS position coordinate readings and the time interval between readings. If an intermediate drive tower 13 nearer to the center pivot point 12 is being monitored and the speed control of the last drive tower is set to a low percent speed setting at main panel 27 (e.g., six seconds on and 54 seconds off to the final drive motor), then the tolerance for determining a non-movement status would be relatively long as compared to monitoring the last or next-to-last drive tower motor 23 of tower 15 of a center pivot sprinkler 10. Whatever mathematical algorithm is used to determine movement or non-movement of a drive tower 15, the micro processor 550 using stored GPS position coordinate readings in non-volatile memory 570 determines a status change event from either "movement" to "non-movement" or from "non-movement" to "movement."

It is to be expressly understood that in one embodiment, all raw data even at close time intervals of one minute could be delivered to the service operator 70 at location 120 for processing by central control computer server 72 according to the methods of FIGS. 4 and 5 or that discussed immediately above. Indeed, in another embodiment all such processing could occur at computer 92 at location 130.

Figure 3:
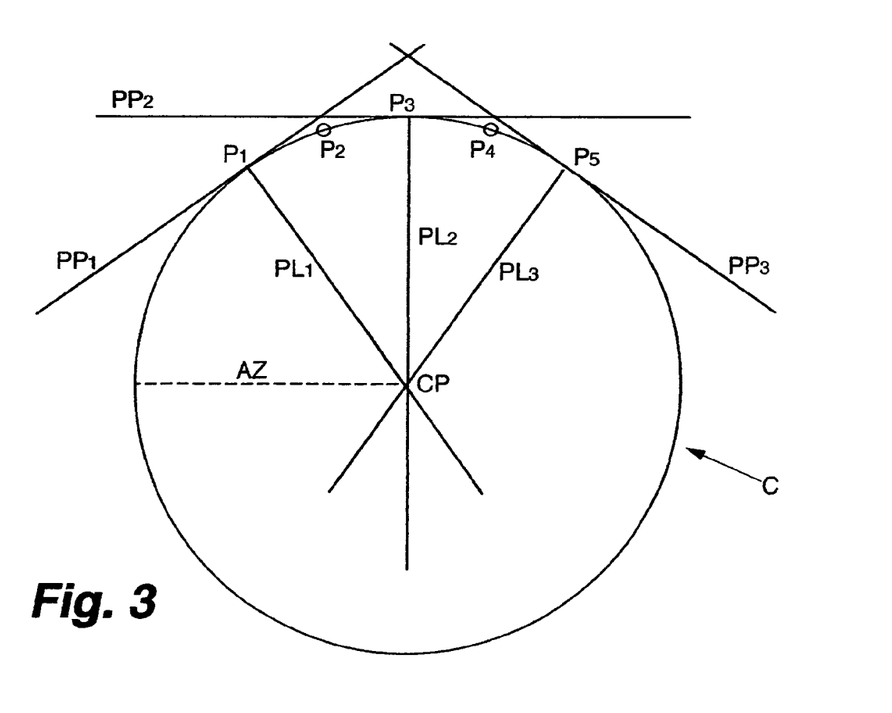
FIG. 3 is a diagram illustrating movement of a pivot irrigation system and GPS coordinate readings being used to plot such movement over time.

FIG. 3 is an illustration of the present invention wherein the central control computer server 72 plots the pattern of sequential GPS position coordinates p1-p5. The sequential GPS position coordinates can be a combination of "events" (FIGS. 4 and 5, step 330) and timed self-reports from RTU 20. Assuming roving pivot arm 18 is continuing to move, the points p1-p5 make up a portion or all of the circumference of the circle formed by the path of the roving center pivot arm 18 at an outer point 20. Using three or more points from p1-p5 along the arc making up the partial circumference C, three respective tangential lines $PP_1$, $PP_2$ and $PP_3$ are plotted. From the point of intersection of lines $PP_1$, $PP_2$ and $PP_3$ with the arc C of circular path (any of p1-p5~), three perpendicular lines $PL_1$, $PL_2$ and $PL_3$ are drawn. The point where lines $PL_1$, $PL_2$ and $PL_3$ intersect is the theoretical center point CP of the circular path C made by the roving pivot arm 18 at outer location point 20. Any straight line from center point CP to the present location on the circumference C of the circle p1-p5~ is the azimuth AZ. The length of the azimuth AZ is the radius of the circle and represents the roving pivot arm 18 location 20 at a point along path p1-p5~. Once the center point CP is determined, any GPS real time position coordinates received from RTU 20 at central control computer 72 can be used to calculate the azimuth AZ for the roving pivot arm 18.

Figure 2:
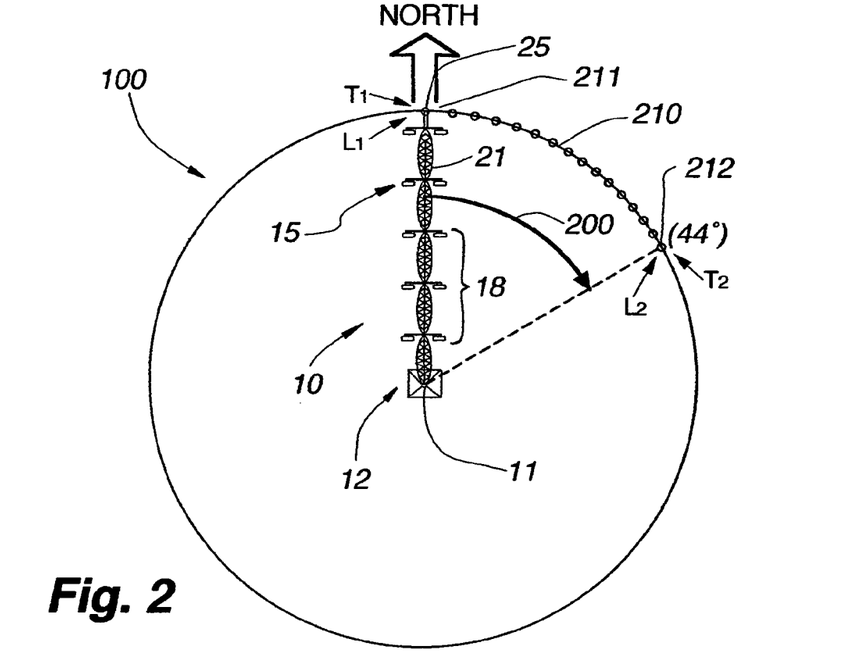
FIG. 2 is a diagram illustrating one method of calculating the center point and the azimuth of a center pivot sprinkler using three GPS position coordinate readings.

In FIG. 2, an overhead view of location 100 is shown with the pivot irrigation system 10 moving in the direction of arrow 200. The movement 200 is typically slow such as one hundred feet per hour. Hence, in ten hours the movement 200 can be over a distance 210 such as one thousand feet, which is shown by time $T_2$. In other words, the movement 200 from time $T_1$ to time $T_2$ is ten hours worth of movement at one hundred feet per hour or one thousand feet. $T_1$ is a time reference and $T_2$ is a second time reference ten hours later. Hence, if the pivot irrigation system 10 were properly operating, the person at the monitor location 130 would expect that at time $T_2$ the pivot would be at location $L_2$ having moved from location $L_1$ at time $T_1$. In this example of ten hours from $T_1$ to $T_2$, the satellite ground station 50 in communication with the RTU 20 has typically taken a number of readings at a frequency such as one every ten to fifteen minutes as illustrated by the dotted line on the circumference of travel 210. Assuming one every ten minutes, or six readings per hour then in ten hours, sixty readings are taken between time $T_1$ and time $T_2$.

All GPS position coordinate readings taken at RTU 20 and transmitted to central control computer 72 are time encoded. These GPS position coordinate readings with time stamp $T_1$-$T_2$~ combined with the theoretical coordinates for center point coordinates CP are also used by software at the central server to calculate the theoretical azimuth AZ of the pivot arm 18, ground speed, direction of travel, and using the wet dry sensor and fixed water delivery rate the rate of water application by acre. As will be explained, in another embodiment, not every reading is transmitted to satellite 40.

Referring to FIG. 2, with ground speed of an outer point 15 (location of RTU 20) of the center pivot arm 18 of irrigation system 10 at one hundred feet per hour, and with a location L reading every ten minutes, the movement between adjacent readings is only seventeen feet per reading. As this is near the error tolerance of most conventional GPS devices, the determination of location L requires more than one reading to occur in the system of the present invention to be assured of movement 200 and how much movement has occurred. Therefore, the primary method and system in the present invention detects the presence of movement (i.e., whether the pivot irrigation system 10 is moving or not) using the current sensor means. However, the GPS means is also used as a redundant back-up to determine movement or non-movement over time as well as to determine the azimuth AZ of the pivot arm 18 from the center pivot point 12, the direction of movement 200 (i.e., clockwise or counterclockwise) and the ground speed of the outer end of the pivot arm 20. The GPS method for determining running or stopped status of a center pivot is significant because it provides a unique way of monitoring the status of a hydraulic powered center pivot or lateral move sprinkler. The current sensor means requires AC current flow and hydraulic pivots do not use AC current for drive or control power.

The detection of the status change event in step 320 of FIG. 4 and step 320' in FIG. 5 are two embodiments of the present invention. In another embodiment, the time readings (self reports from RTU 20) $T_1$-$T_6$ (FIG. 6) and time readings $T_1$-$T_6$ (FIG. 7) could occur at ninety-minute intervals and steps 320 and 320' are not used. Each GPS position coordinate reading would then be transmitted 330 and 330', and any processing with respect to movement or non-movement of the pivot irrigation system 10 would use GPS position coordinates logged over time at the service operator 70 location 120 using central control computer 72.

Figure 6:
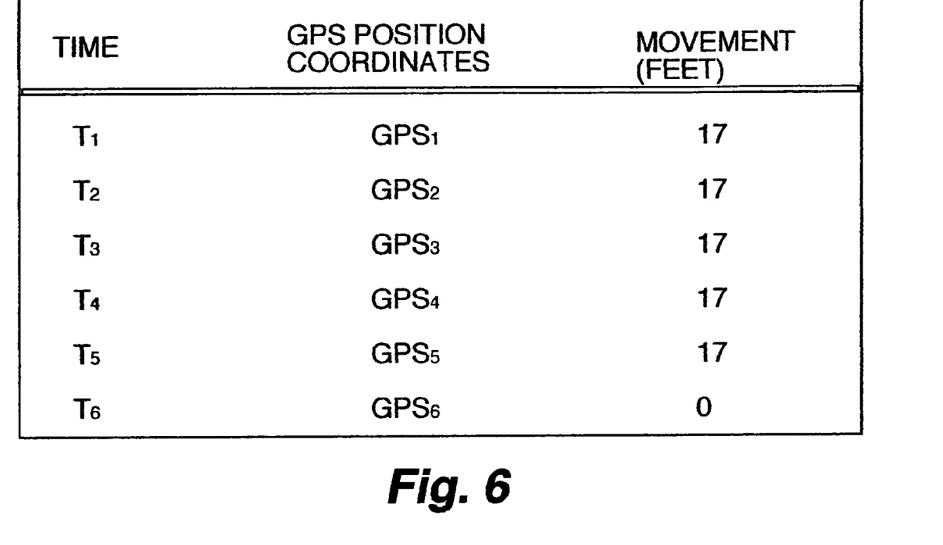
FIGS. 6 and 7 are illustrations showing status change detection and approximation of pivot position over time using GPS data.

FIG. 6 sets forth a table showing GPS coordinate readings ($GPS_1$-$GPS_6$) corresponding to times ($T_1$-$T_6$). Assume the RTU 20 takes readings every ten minutes and further assume that the ground speed is one hundred feet per hour. It is expected that if the center pivot irrigation system 20 is moving it should move about seventeen feet every reading. Due to the tolerance error in the GPS readings, the seventeen feet reading is small enough to be near the tolerance error. Therefore, several sequential GPS position coordinate readings are required. The processor 550 (see FIG. 9) calculates the fixed center pivot point CP and determines the azimuth AZ of the roving pivot arm 18 for each GPS reading, the linear distance between recorded time-stamped GPS coordinates stored in memory 570 and further calculates direction of travel and ground speed.

Figure 7:
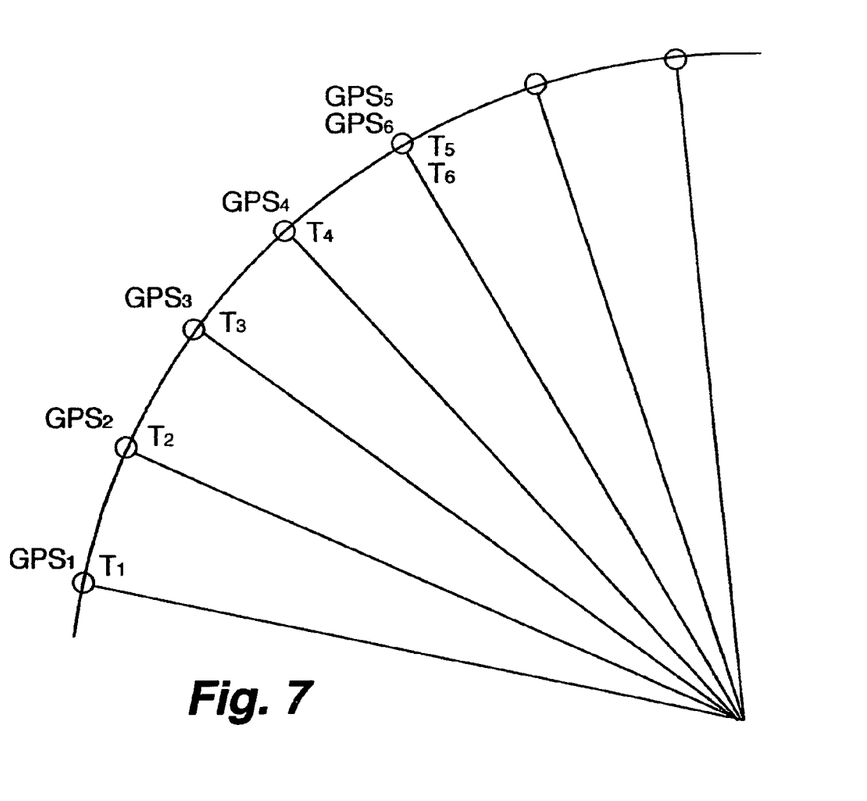

With reference back to FIG. 5, in step 310' the RTU 20 receives readings at times $T_1$-$T_6$. The processor 550 in the RTU 20, over several readings, then processes the GPS readings. For example as shown in FIG. 7, assume the pivot irrigation system 10 is moving (i.e., the status is "moving") prior to $T_1$ in arc 400, the $GPS_1$ reading at time $T_1$ is compared with several prior readings and movement is verified so no status change occurs in stage 320'. At time $T_2$ the $GPS_2$ reading is compared to several prior readings and movement is again verified. Likewise, the RTU 20 reaches the same conclusion at reading time $T_3$, $GPS_3$. And, at time $T_4$, $GPS_4$ again, movement is verified. At time $T_4$, $GPS_4$, in one embodiment, the microprocessor 550 can look at the prior four GPS readings (i.e., over forty minutes) to verify that movement of about sixty-eight feet has occurred. Prior GPS readings with time stamps are stored in memory 570. This distance is outside the error tolerance of the GPS readings and verifies that movement is ongoing so there is no status change occurring in step 320'.

In other words at four discrete times $T_1$-$T_4$, loop 302' occurs in FIG. 5. Assume at time $T_5$, $GPS_5$ the processor 550 in the RTU 20 with respect to that one reading senses no movement, but since this one reading is within the error tolerance of the GPS system when compared to the prior three readings ($T_4$, $T_3$ and $T_2$), the RTU 20 determines movement has occurred and thus no status change in 320'. However with respect to reading at time $T_6$, $GPS_6$ when compared to readings at $T_5$, $T_4$ and $T_3$, in forty minutes only thirty four feet in movement has been detected, the RTU 20 in step 320' concludes a status change of "no movement" has occurred based on readings at $T_3$, $T_4$, $T_5$, and $T_6$ and step 330' is entered. It is to be expressly understood that more or less than four readings could be utilized and more or less than ten minutes could be utilized depending upon the design configuration. A number of different mathematical algorithms could be used to determine when a status event occurs in step 310' that requires a status change in 320'. The mathematical algorithm used depends upon the tolerance for error of the GPS receiver, the time interval, and the ground speed.

The above calculations can also include confidence and sequence factors. For example, with respect to confidence, if the status were moving, high confidence of no movement would be five successive readings within the tolerance error. A lower confidence would be three successive readings. With respect to sequence, if in the above example at time $T_6$, $GPS_6$, a noticeable seventeen-foot change was observed, the sequence of events at times $T_4$ and $T_5$ in one embodiment of the algorithm, may be ignored. Whatever mathematical algorithm is used, the processor 550 using stored GPS readings in memory 570 determines a status change event from either "movement" to "non-movement" or from "non-movement" to "movement."

Furthermore, the detection of the status change in step 320 of FIG. 5 is one embodiment of the present invention. In another embodiment, the time readings $T_1$-$T_6$ and $GPS_1$-$GPS_6$ could occur at thirty-minute intervals and step 320' is not used. Each reading would then be transmitted 330', and any processing with respect to movement or non-movement of the pivot irrigation system 10 would occur at the service operator server 70 location 120. Again, the time interval of thirty minutes is subject to design configuration and GPS accuracy considerations.

It is to be expressly understood that in one embodiment, all raw GPS data even at close time intervals of ten minutes could be delivered to the service operator server 70 for processing according to the method of FIG. 5 or that discussed immediately above. Indeed, in another embodiment all such processing could occur at the subscriber monitor 90 location 130.

Figure 8:
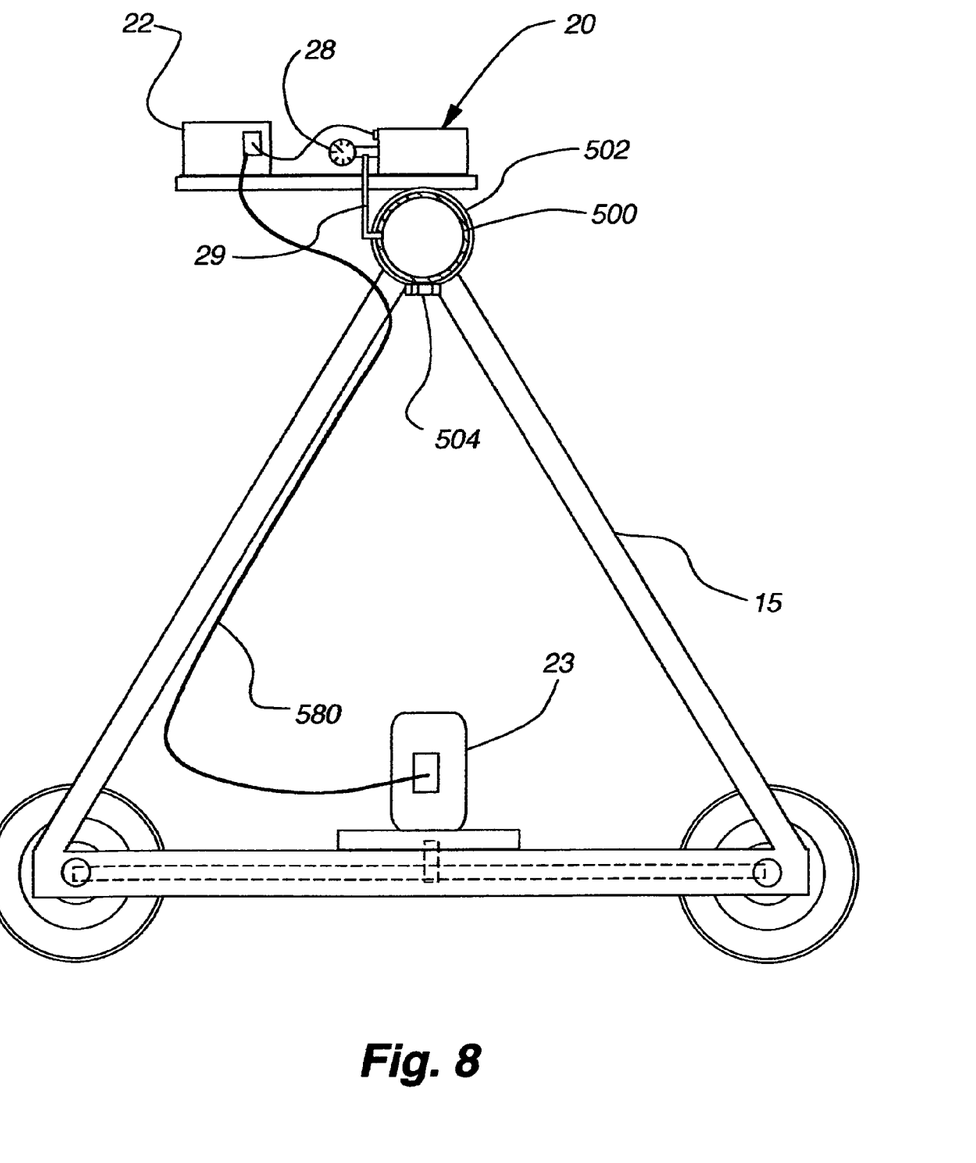
FIG. 8 is a pictorial diagram and FIG. 9 is a block diagram showing the wireless interface RTU with GPS receiver, a center pivot tower control box, a current sensor to detect current flow through an electrical circuit of a tower drive motor and a water pressure sensor to detect water delivery—all mounted on the water delivery pipe span near an outer drive tower of a center pivot irrigation system.
Figure 9:
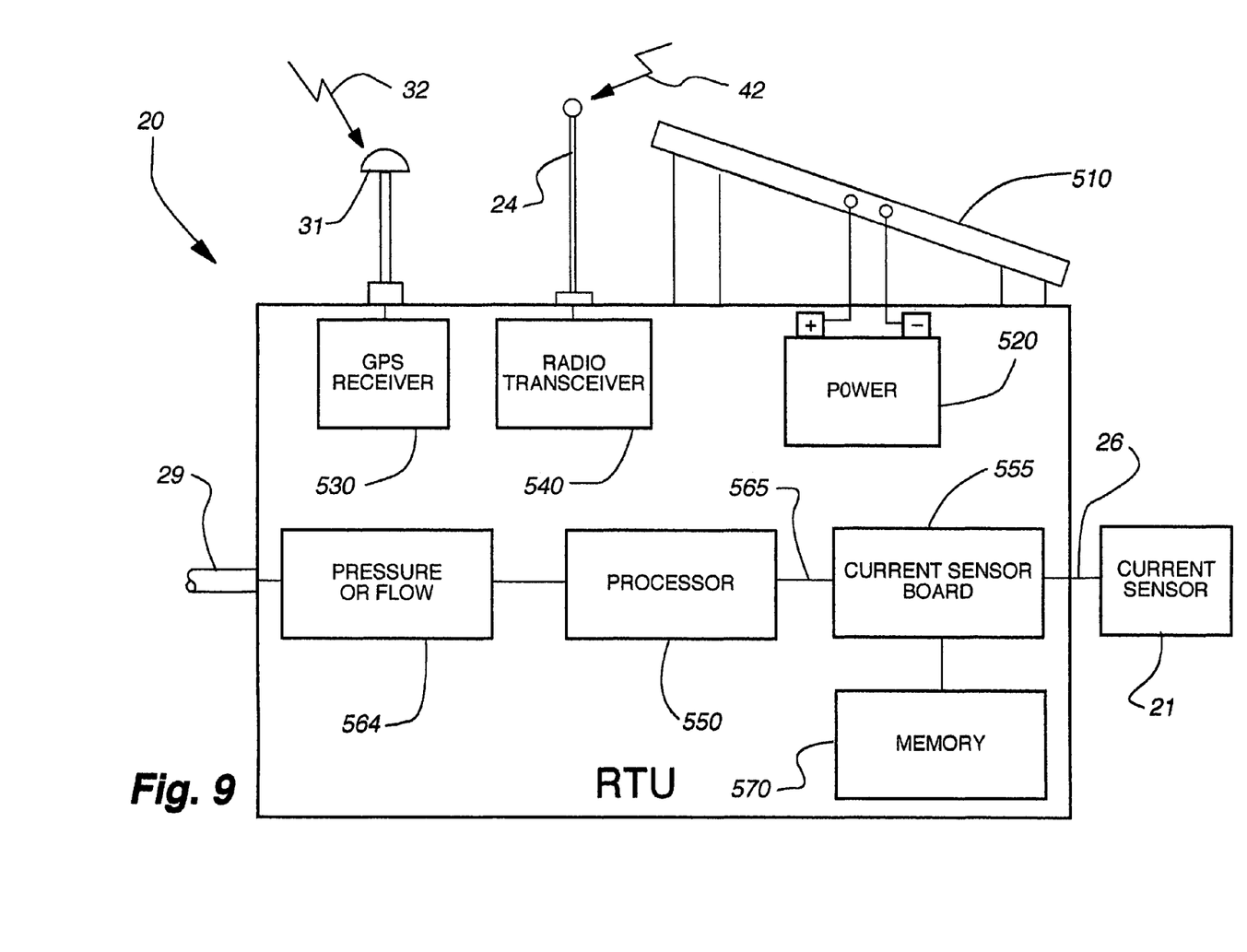

In FIGS. 8 and 9, the RTU 20 is shown mounted to a pipe 500 at drive tower 15 of the pivot irrigation system 10. The RTU 20 is mounted by means of a strap 502 and is securely affixed thereto by means of a clamp 504 engaging the strap 502. The RTU 20 is mounted in a horizontal position and has a solar panel 510 mounted horizontally on the top of the RTU 20 to continually charge a battery within the power supply 520 within the RTU 20. The GPS antenna 31 is interconnected to a GPS receiver 530, the satellite data receiver antenna 24 is connected to a satellite transmitter 540 and the RTU 20 contains a microprocessor 550. Also shown in FIG. 8 is a water pressure switch and gauge 28 (optional) with a water hydraulic line 29 connected to the pipe 500 to sense the water pressure inside the pipe and a corresponding transducer 564 for converting the analog water pressure to an electrical or digital signal. The processor 550 is in communication 565 with the electrical circuit 564. A current sensor 21 and connecting cable 26 is connected to a current sensor circuit board 555. The current sensor board 555 detects the presence or absence of AC current flowing through a single conductor of the three-phase motor drop cable 58 connected to drive motor 23.

It is to be expressly understood that other components can be found in the RTU 20 and that the RTU 20 has an encapsulated housing which is environmentally sealed to protect its contents from external elements. The satellite transmitter 540 is a satellite radio transmitter and receiver. The processor 550 is programmed with suitable software to operate with respect to the discussion above with respect to the flow charts of FIGS. 4 and 5. The processor 550 is connected to a non-volatile memory 570.

As shown in FIG. 3, what is delivered to the subscriber at the subscriber's location 130 or at a mobile location could be a graphic display. The graphic display could be overlaid with a topological map of the field, a satellite view of the field, or an aerial view of the field. This provides important information to the subscriber as the subscriber may be aware of certain topological or soil conditions with respect to the field at the present detected location of the roving pivot arm 18 of pivot irrigation system 10.

Figure 10:
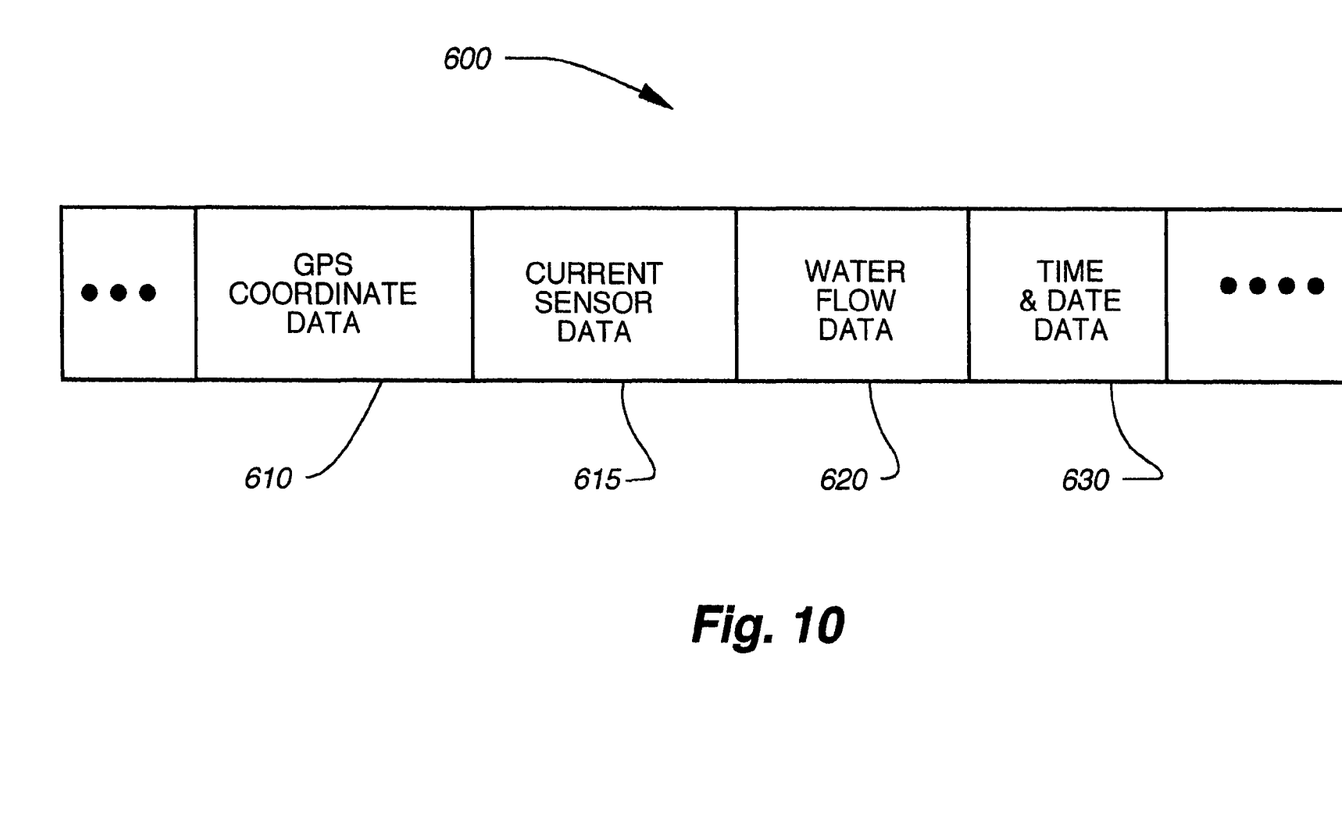
FIG. 10 is a pictorial diagram of a data packet with data fields of the present invention.

In FIG. 10, a data packet 600 that is transmitted from antenna 24 over wireless link 42 to satellite 40 and then to ground station 50 is shown. The data packet 600 contains a field 610 containing the GPS coordinates, a field 615 containing the current sensor status, a field 620 containing the water flow information and a field 630 for the time and date stamp. It is expressly understood that the arrangement of these fields is based on design choice, and that other information could be present in additional fields in the data packet 600.

With respect to collecting water pressure and/or flow information from pressure switch 28 and transducer 564, the processor 550 at the time intervals T stores readings with a time stamp in memory 570. Unlike the GPS readings, the water pressure/flow readings do not have a high tolerance error and in one embodiment of the present invention, whenever a water pressure/flow reading changes, processor 550 enters step 320 or 320' and transmits the event to ground station 50. The pressure switch 28 and transducer 564 in FIG. 9 can be set to a digital input high or digital input low so as to operate as an on/off switch. In this embodiment, rather than that discussed previously, the processor 550 does not take individual pressure readings. Rather, a pressure threshold for wet and dry status can be set for each individual pivot situation.

At other predetermined time intervals such as every twenty-four hours, the processor 550 sends a "heartbeat" data packet to the ground station 50 and then to the service operator 120 simply to verify normal operation of the RTU 20. Heartbeat data packet transmissions are conventional. The heartbeat data packet includes the same information such as the current sensor reading indicating movement or non-movement status of the monitored outer tower, the GPS coordinates (time stamped) and the wet/dry water delivery status. The GPS coordinates are conventional latitude and longitudinal coordinates and can also be used to determine movement or non-movement status of hydraulic powered center pivot or lateral move sprinklers.

The RTU 20 can also include additional sensor data, including wireless data received over a local radio system that relays soil moisture and temperature readings, bug counts, canopy shade, etc. Such data could be GPS defined in the respective field with the data incorporated into the graphic displays of pivot GPS and water delivery status data.

As fully discussed above, the RTU 20 of the present invention is located at or near the end tower 15 of the center pivot 10 and is a self-contained, universal RTU that will work with any of a number of conventional pivot or lateral move irrigation systems 10 from a wide variety of manufacturers. The term "self-contained" means that the RTU 20 does not interface to the electronics or the wiring of the control or power circuitry for the mechanized irrigation system 10. It provides a self-contained operation independent of and isolated from the electrical circuitry of the mechanized irrigation system 10. The RTU 20 does not interface with any control electronics of the pivot irrigation system 10. It is, therefore, easily relocated to different center pivots to maximize monitoring benefits as to other irrigation systems. The RTU 20 is located in a position to provide ample sunlight to its solar panel 510 and to allow antennas 24 and 31 to optimally operate without encountering any adverse effects from the operation of the pivot irrigation system 10 such as water spray.

Figure 11:
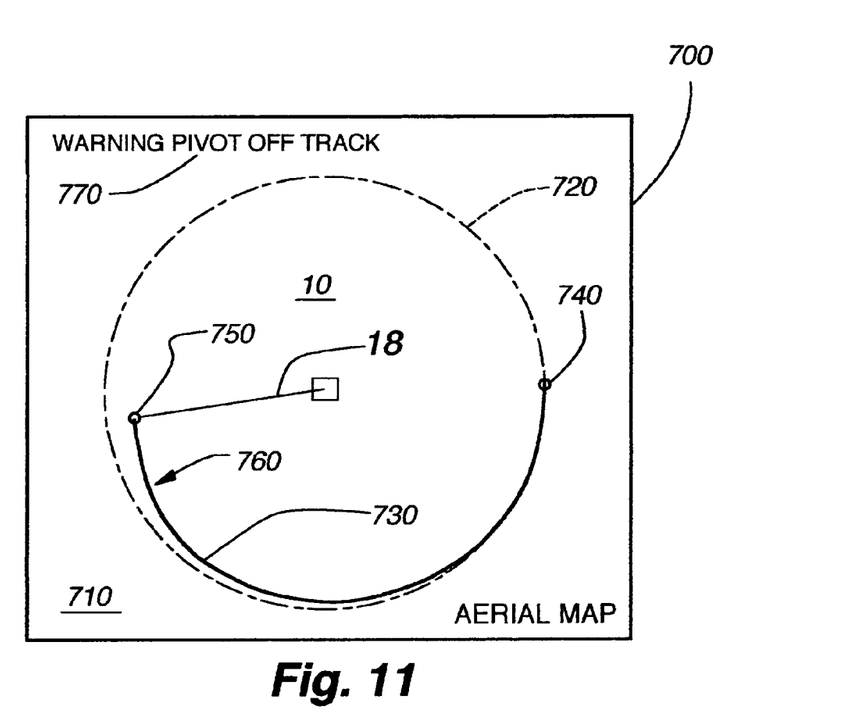
FIGS. 11 and 12 are pictorial diagrams of aerial maps of the irrigation site showing the historic path of the moving sprinkler and current deviation which can trigger malfunction alerts.

In FIG. 11, a display 700, in one embodiment, is provided to the subscriber in the mobile device 80 and/or the computer 92 at location 130. In FIG. 11, the display 700 has the aerial map 710 displayed for a pivot 10. A geographic information system (GIS) source for map data could also be used. With each full rotation of the pivot irrigation system 10, the service operator 70 provides an expected path 720 (shown in dotted lines). In other words, the service operator software in control computer 72 learns from prior rotations as to what is the expected rotation 720. In another embodiment, rather than having an expected rotation based upon a number of prior rotations, the path 720 could simply be the last path of rotation. What is provided to the subscriber either in mobile device 80 or in computer 92 at location 130 is path 720 (based upon historic travel or the immediately prior travel). The current path 730 (shown in solid line) is also displayed having a start position 740 and a current position 750. With the pivot 10 normally operating the current travel path 730 will overlay path 720. When the current position 750 comes full circle back to start 740, path 730 starts all over again. Or, in another embodiment, the point 740 could be continually moving such as always trailing 180° from the current position 750 (or any suitable trailing angle).

This provides important information to the subscriber. For example as shown in FIG. 11, a deviation 760 is occurring.

This could be mechanical failure in that the end drive tower 13 of the pivot irrigation system 10 is moving out of the normally expected ground track for the end wheels 11, which could be caused by the pivot irrigation system 10 jackknifing (collapsing inward toward the center pivot point) somewhere along its roving line 18.

Figure 12:
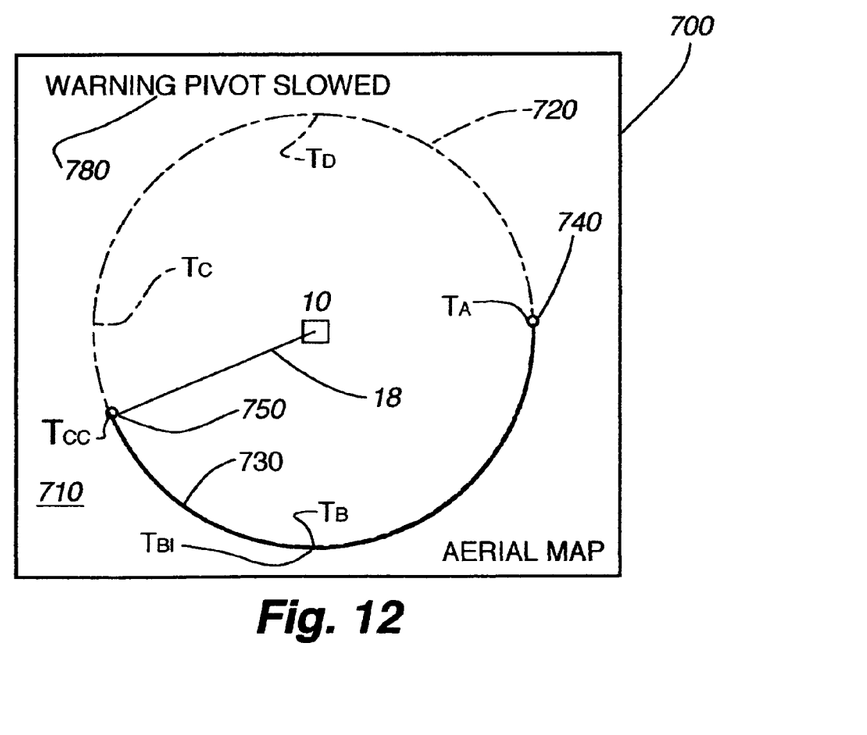

In another aspect of the present invention shown in FIG. 12, the service operator 70 in its control computer 72 analyzes the data received and provides the same information as found in FIG. 11. However, in addition, based upon a prior number of historic full complete paths 720 of the pivot irrigation system 10, the central control computer 72 software determines expected times for arrival of the end tower 13 of the pivot as it travels the full circular path 720. In FIG. 12, these historic times are labeled $T_A$-$T_B$. Any suitable number of historic times around the historic path 720 can be established by software in the control computer 72. In FIG. 12, the current travel path 730 is on track at current time $T_{BC}$ that corresponds to time $T_B$. However, end 15 carrying the RTU 20 of the present invention does not arrive at the historic expected time of $T_C$. As shown in FIG. 12, the current time $T_{CC}$ for the end of the pivot 10 is at location 750 (based upon GPS coordinates). A malfunction has obviously occurred with the pivot 10 such as a flat tire on the outer tower that slows down the pivot movement or other drive mechanism failing. The subscriber can immediately visit the pivot irrigation system 10, site 100 to effectuate repairs. It is to be understood that in this situation of FIG. 12, the pivot irrigation system is still moving and so a "status event" had not been detected by either the current sensor means or by the GPS means in FIG. 4 and 5, respectfully.

In FIGS. 11 and 12, suitable warning messages 770 or 780 could be utilized such as audible indicators, graphic indictors, text messages, alerts, email messages, paging messages, etc.

It is understood that while a self-contained RTU 20 has been shown and described, it is also possible to locate the elements, such as the solar array and antennas remotely from the unit and they can be connected to the unit by suitable cables and connectors.

It is to be understood that the central processing computer can utilize the received data concerning the status of the mechanized irrigation system to perform various calculations. Through the use of the data the central processor can calculate the theoretical center point of the arc or circle plotted by a series of GPS data points recorded over time. In addition the central data processor can calculate the theoretical azimuth between the center point of the arc or circle covered by the sprinkler and the position of the roving RTU as defined by the GPS position coordinate data received in the most current data packets from the RTU. The center processor further calculates the area of the circle covered by the irrigation system using the azimuth as the radius and can currently determine the angular position of the azimuth from north which identifies the position of the roving pivot arm. The central processor can use the theoretical azimuth as the radius of a full circle covered by the irrigator to calculate the area of the irrigated circle. It can also use the GPS data points and two respective azimuths to define a pie shaped area of the irrigated circle. Thus the respective irrigated section of the circular field is determined using the time stamp sequential GPS position data points and each respective azimuth to calculate the area. By using the water delivery rate from the irrigation system and the elapsed time between two data points the area in acres of a section defined by the two data points can be used to calculate the acre inches of water applied to the designated area.

The central control processing computer can also calculate the water application in acre-inches resulting from the rotation speed calculated and by applying variables of water pumping rate, acreage irrigated and water application efficiency assumptions. In addition the central processing computer can calculate the time to complete a full circle by the irrigator. Along with these calculations the central control processing computer can determine expected time for arrival of the roving pivot arm to reach various predetermined positions in the irrigated field. It is further understood that the RTU self reports data packets of pivot status and GPS coordinates on a periodic timed basis such as every twelve hours.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. In a pivot irrigation system wherein a control circuit controls movement of the pivot irrigation system, the improvement comprising:
   a universal remote terminal unit independent of and not interfacing with said control circuit, said universal remote terminal unit comprising:
      a global positioning satellite receiver mounted within a self-contained housing, said self-contained housing mounted to an outer moving portion of said pivot irrigation system, said global positioning satellite receiver including an antenna mounted on said self-contained housing, said global positioning satellite receiver generating output data signals indicative of the location coordinates of the universal remote terminal unit which over a series of timed readings is indicative of the movement of the pivot irrigation system;
      a microprocessor in said self-contained housing and connected to receive said output signals from said global positioning satellite receiver, said microprocessor processing the output data signals to determine whether the pivot irrigation system is moving or not moving and preparing status data indicative of a movement change;
      telemetry in said self-contained housing and connected to said microprocessor, said telemetry sending the status data from the microprocessor over a wireless communication path so as to alert an operator of an operational change in the movement of the irrigation system.

2. The improvement of claim 1 wherein the housing is encapsulated and further comprising the encapsulated housing mounted to an outer wheel drive tower of the pivot irrigation system whose movement is indicative of the operation of the irrigation system.

3. A method of monitoring field movement of a pivot irrigation system independently of a control circuit located on the pivot irrigation system, the control circuit at least controlling field movement of the pivot irrigation system, the method comprising the steps of:
   generating coordinate data at predetermined time intervals in a global positioning system receiver located in a self-contained unit independent of and not interfacing with the control circuit on an outer moving portion of the pivot irrigation system;

determining operational data based on the generated coordinate data in a computer located in the self-contained unit independent of the control circuit and not interfaced with the control circuit when movement of the pivot irrigation system changes;

delivering the operational data from the self-contained unit independent of the control circuit and not interfaced with the control circuit to a communications network and into a service computer, the service computer remotely located from said pivot irrigation system;

generating in the remote service computer at least one type of information message on movement change based on the delivered operational data; and receiving the generated information message on movement change in at least one mobile operator device.

4. The method of claim 3 further comprising the step of:
placing the self-contained unit on a pipe span above an outer drive tower of the pivot irrigation system.

5. The method of claim 3 further comprising the step of:
determining at least one operational parameter, for the at least one type of information message; on movement change from the operational data in the computer located in the self-contained unit.

6. The method of claim 3 further comprising the step of:
determining at least one operational parameter, for the at least one type of information message on movement change from the operational data in the remote service computer.

7. The method of claim 3 wherein the at least one generated information message on movement change contains information as to the speed of the moving pivot irrigation system.

8. The method of claim 3 wherein the at least one generated information message on movement change contains information as to the direction of movement of the pivot irrigation system.

9. The method of claim 3 further comprising the steps of:
comparing, in the computer in the self-contained unit, coordinate data during a current predetermined time interval with prior coordinate data obtained during at least one prior predetermined interval;

delivering the current coordinate data as the operational data from the self-contained unit to the communications network when the current coordinate data has changed from the prior coordinate data in response to the step of comparing; and determining, in the service computer, movement status of the pivot irrigation system from the delivered current coordinate data in the operational data.

10. The method of claim 3 further comprising the steps of:
comparing, in the computer in the self-contained unit, coordinate data during a current predetermined time interval with prior coordinate data obtained during at least one prior predetermined interval;

determining, in the computer in the self-contained unit, movement status of the pivot irrigation system when the current coordinate data has changed from the prior coordinate data in response to the step of comparing; and delivering movement status in the operational data from the self-contained unit to the communications network.

11. The method of claim 3 wherein the step of delivering further comprises:
delivering the operational data from the self-contained unit to a communications satellite in communication with the communications network.

12. The method of claim 3 wherein the step of delivering further comprises:
delivering the operational data from the self-contained unit to a terrestrial telemetry in communication with the communications network.

* * * * *